INVENTOR
Waldemar T. Rentschler
BY
Arthur A. March
ATTORNEY

| $U_v$ | Time | Shutter | Film-Empf.° |  RZ/=LZ | Film-Empf.° | Shutter | Entf. (m) | Time |
|---|---|---|---|---|---|---|---|---|
| $U_0$ | 30 | 2,8 | 30 | 7/=28 | 30 | 2,8 | 10 | 30 |
| $U_1$ | 60 | 2,8 | 30 | 7/=28 | 30 | 2,8 | 10 | 60 |
| $U_2$ | 125 | 2,8 | 30 | 7/=28 | 30 | 2,8 | 10 | 125 |
| $U_3$ | 250 | 2,8 | 30 | 7/=28 | 30 | 2,8 | 10 | 250 |
| $U_4$ | 500 | 2,8 | 30 | 7/=28 | 30 | 2. | 10 | 500 |
| $U_5$ | 500 | 4 | 30 | 10/=28 | 27 | 2,8 | 10 | 500 |
| $U_6$ | 500 | 5,6 | 30 | 14/=28 | 24 | 2,8 | 10 | 500 |
| $U_7$ | 500 | 8 | 30 | 20/=28 | 21 | 2,8 | 10 | 500 |
| $U_8$ | 500 | 11 | 30 | 28/=28 | 18 | 2,8 | 10 | 500 |
| $U_9$ | 500 | 16 | 30 | 40/=28 | 15 | 2,8 | 10 | 500 |
| $U_{10}$ | 500 | 22 | 30 | 56/=28 | 12 | 2,8 | 10 | 500 |
| $U_{11}$ | 500 | 22 | 27 | 56/=28 | 12 | 4 | 7 | 500 |
| $U_{12}$ | 500 | 22 | 24 | 56/=28 | 12 | 5,6 | 5 | 500 |
| $U_{13}$ | 500 | 22 | 21 | 56/=28 | 12 | 8 | 3,5 | 500 |
| $U_{14}$ | | | | 56/=28 | 12 | 11 | 2,5 | 500 |
| $U_{15}$ | | | | 56/=28 | 12 | 16 | 1,8 | 500 |
| $U_{16}$ | | | | 56/=28 | 12 | 22 | 1,25 | 500 |

United States Patent Office 3,392,643
Patented July 16, 1968

3,392,643
PHOTOGRAPHIC CAMERA HAVING AUTOMATIC DAYLIGHT AND FLASH EXPOSURE CONTROL WITH ELECTRICAL COMPENSATION OF COUPLED EXPOSURE METER DURING FLASH EXPOSURES
Waldemar T. Rentschler, Calmbach (Enz), Germany, assignor to Prontor-Werk Alfred Gauthier, G.m.b.H., Calmbach (Enz), Germany, a corporation of Germany
Filed Apr. 23, 1965, Ser. No. 450,373
Claims priority, application Germany, Apr. 25, 1964, G 40,454
5 Claims. (Cl. 95—10)

ABSTRACT OF THE DISCLOSURE

A photogaphic camera having an exposure meter to control at least one exposure parameter wherein the exposure meter has a measuring mechanism and an indicator. A distance setting control and an exposure time setting control are provided in addition to a flash intensity control settable according to predetermined flash intensities. Mechanical means connect the exposure time setting control to the measuring mechanism to vary the setting of the indicator in making photographs in ambient light and by flash. The electrical circuit provides a current source and variable resistor means to control current flow from the source. Means are provided to connect the current source and the variable resistor means to the measuring mechanism to control the setting of the indicator. In addition, means are provided to connect the variable resistor means to the flash intensity control and the distance setting control to govern the setting of the indicator so as to compensate for setting the exposure time setting control in making flash exposures.

---

The present invention relates to a photographic camera having means for automatically setting the diaphragm for both daylight and flash exposures. In particular, the diaphragm is set in response to the position of the indicator of a measuring mechanism of an electrical exposure meter. For daylight exposures, the exposure time and the film sensitivity settings are taken into account by altering the starting position of the measuring mechanism. For flash exposures, two potentiometers are provided for controlling the measuring mechanism. One potentiometer serves to take into account the intensity of the flash source while the other potentiometer serves to take into account the distance setting.

It has been proposed that in a camera in which the time is preselected and the diaphragm is set either fully automatically or with a rotatable measuring mechanism, that the exposure meter be used not only for automatic daylight settings, but also for automatic flash settings. However, it has been found that such an arrangement is relatively complex and expensive to fabricate. The complexity and expense is due primarily to the fact that the measuring mechanism must be set to a specific starting position before a flash exposure may be carried out. Another disadvantage of this arrangement is that the mechanical members provided for controlling the measuring mechanism render the installation of the exposure meter in the camera more difficult than in those cameras which are equipped with an automatic daylight setting system.

The present invention provides for overcoming the shortcomings and limitations mentioned above. In particular, the present invention provides a camera which, while using a rotatable measuring mechanism, comprises both an automatic daylight setting system and an automatic flash setting system. Neither the form nor the arrangement of the measuring mechanism in this camera need be different from the form and arrangement of the measuring mechanism in those cameras in which the exposure meter is used exclusively for automatic daylight settings.

The foregoing is achieved according to the present invention by providing an operative gear connection, when effecting flash exposures between the measuring mechanism and the setting members for exposure time and film sensitivity. This connection is such that the measuring mechanism is moved during the setting of the two setting controls to the same extent as when taking daylight photographs. A potentiometer, operatively connected to the exposure time setting control, is provided by means of which the change in the starting position of the measuring mechanism effected by the setting movement of the exposure time setting control is compensated for electrically. On the other hand, changes in the starting position of the measuring mechanism which are brought about by the setting movement of the film sensitivity setting control remain effective. Furthermore, this potentiometer also serves to take into account the intensity of the flash source and can be set according to a scale which indicates the intensity of the flash source in values applicable for specific film sensitivities. This arrangement produces, with comparatively simple structural members, not only a fully automatic setting of the diaphragm for daylight exposures of the camera, but, in addition thereto, exposures in the flash range of the camera, as well. Flash exposures of this camera are not limited to the use of those flash bulbs which require an exposure time setting suitable for flash exposures, for example, 1/30 second. Instead, this camera permits the use of a flash with any exposure time which may be set in the camera. The present invention is of special importance when carrying out exposures when there is no appreciable daylight brightness, but where the movement of the object requires a shorter exposure time than 1/30 second.

An advantageous arrangement, particularly for a camera with an intra-lens shutter, is that the resistor which provides the electrical compensation for the setting movements of the exposure time setting control and the resistor which serves to take into consideration the intensity of the flash source are combined into a single potentiometer. In addition, to satisfy the structural requirements of a camera having an intra-lens shutter, the potentiometers are arranged on the front plate of the shutter.

In order to limit both the expense and space requirements of the arrangement according to the present invention, the arrangement further provides that the potentiometers are in the form of carbon layer potentiometers. Another feature of the invention resides in the fact that the flash index or guide member setting control may be coupled in different relative positions with the exposure time setting control by means of a coupling handle. This type of coupling connection creates the preliminary conditions which fully take into account, in every respect, the requirements with respect to operational simplicity and clarity of the camera.

Details of the invention will become apparent from the specification which follows and from the accompanying drawings in which.

Figure 1:
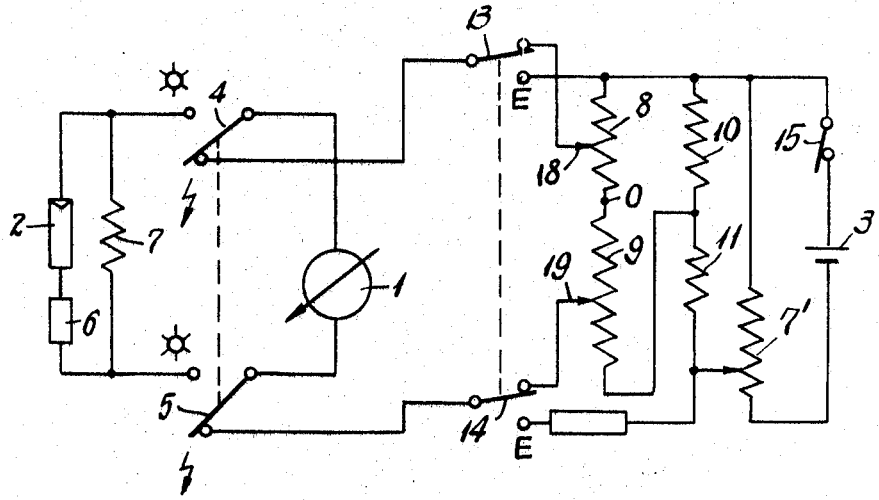
FIG. 1 shows the wiring diagram of two circuits, one of which comprises a photocell and the other of which comprises a battery which serves as a voltage source.

To explain the invention, the specification which follows refers, by way of example, to a camera (not shown in the drawings) in which the diaphragm is set fully automatically both for daylight and flash exposures, after the exposure time has been preselected and prior to the actual exposure operation, by sensing the position of the indicator of an exposure meter built into the camera housing. By referring to a camera provided with a fully automatic diaphragm setting, there is no intent to exclude the fact that the invention is also applicable to cameras which are provided with a resetting device associated with the exposure meter and which permit setting the diaphragm semi-automatically. It will be apparent that it is unnecessary to explain the invention in connection with a camera in which the diaphragm setting is accomplished semi-automatically. The essential functional difference between the two types of cameras lies merely in the fact that the lamellae are set automatically by a sensing device in response to the actuation of the camera release member when the diaphragm setting is fully automatic, whereas the setting of the diaphragm in a camera with a resetting device is accomplished through the movement of the measuring mechanism indicator by means of the manually operable diaphragm setting member until it is brought into coincidence with a fixed mark.

Referring to the drawings, since the automatic diaphragm setting, both for daylight and flash exposures, is effected with the aid of a measuring mechanism 1 of an exposure meter, the camera is provided with a voltage source, for example, a battery 3, for providing energy to the measuring mechanism 1 when the camera is operated for flash exposures. The battery 3 is applied to the measuring mechanism 1 prior to carrying out an exposure in one of two ways depending upon the requirements of the prevailing light conditions. As is shown in the wiring diagram in FIG. 1, a double pole switch having switch blades 4 and 5 is provided for this purpose. The switch blades 4 and 5 have two contact positions identified by a sun symbol and by a flash symbol, respectively. If the switch blades 4 and 5 are, as shown in FIG. 1, in contact with the switch terminals identified by the flash symbol, the voltage of the battery 3 is applied to the measuring mechanism 1 independent of the prevailing light conditions. On the other hand, when the switch blades are connected to the switch terminals identified by the sun symbol, the measuring mechanism 1 is supplied with a current developed by a photocell in response to the prevailing light conditions which current is supplied through a voltage reducing series resistor 6 located in the circuit of the photocell 2.

Instead of using a photocell when taking daylight exposures, a photo-conductive cell and a battery which serves as a power source may also be used. The photo-conductive cell and the battery would be connected into the circuit with the measuring mechanism 1 in the usual manner. For such an arrangement, an additional battery for operation in the flash range may be dispensed with, but measures would have to be taken to insure that the flash circuit is supplied with a battery current when the camera is switched from the automatic daylight setting to the automatic flash setting. In addition to the double-pole switch 4, 5, provision would have to be made for an additional reversing switch which reverses the current supplied by the battery.

The wiring diagram in FIG. 1 further includes a calibration resistor 7 designed to regulate the voltage in the circuit of the photocell 2. The circuit of the battery 3 includes, in addition to a calibration resistor 7' provided for the same purpose as the resistor 7, two potentiometers 8 and 9. Potentiometer 8 is set in accordance with the distance setting of the camera, while potentiometer 9 is set in accordance with the intensity of the flash source. One end of the potentiometer 9 is connected to the junction of a pair of resistors 10 and 11 which serve as a voltage divider. The wiper arms 18 and 19 of the potentiometers 8 and 9, respectively, are connected through a second double-pole switch having switch blades 13 and 14 and the double-pole switch 4, 5 to the measuring mechanism 1. The measuring mechanism 1 indicates a voltage which is the result of the sum of the two partial voltages tapped from the potentiometer 8 and 9. A second switch terminal designated by E is provided for each of the switch blades 13 and 14. The switch blades are connected to the terminals E for purposes of calibration. An on-off switch 15 is provided in the battery circuit to connect the battery when battery current is required and to disconnect the battery when the camera is switched into the automatic daylight operating range.

Figure 2:
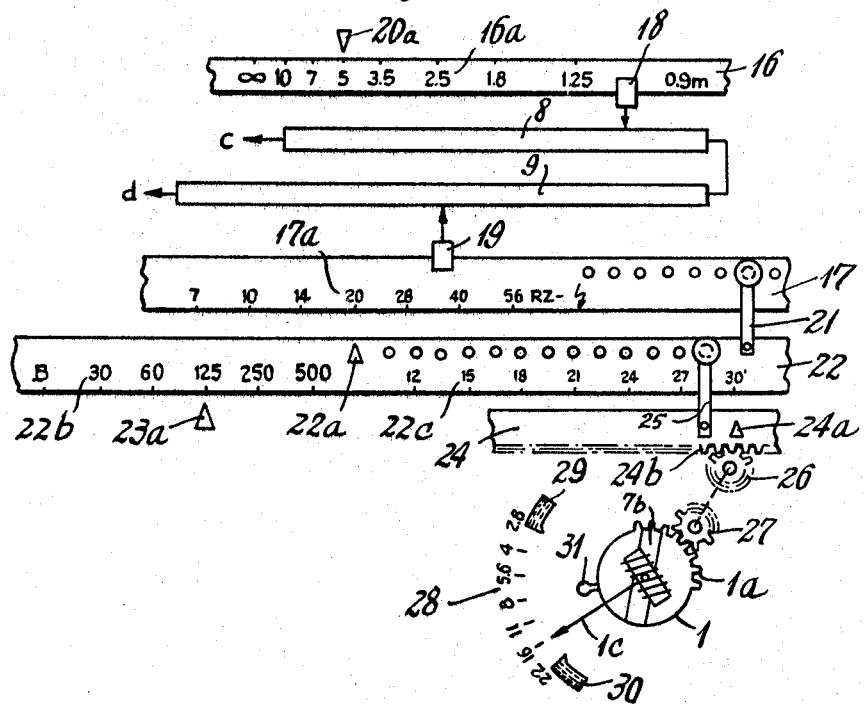
FIG. 2 is a diagrammatic view of the arrangement of the setting controls of a camera designed both for effecting daylight exposures and for taking into consideration the individual exposure factors in flash exposures.
Figure 3:
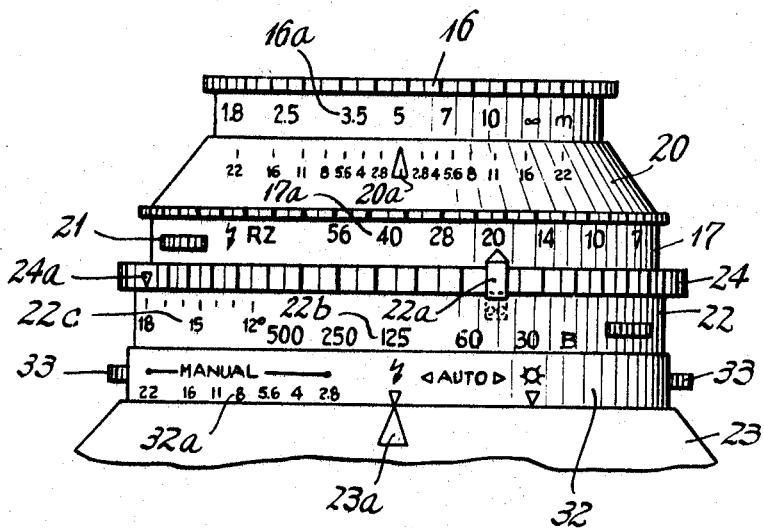
FIG. 3 shows a view of an intra-lens shutter equipped with the setting controls shown in FIG. 2.

Additional details as to the structure and characteristics of the potentiometers 8 and 9 are provided in connection with the explanation of the setting controls of an intra-lens shutter illustrated in FIGS. 2 and 3. Referring to FIG. 2, it is seen that the potentiometer 8 is operatively associated with a distance setting control 16 designed to set the lens, while thhe potentiometer 9 is operatively associated with a setting control 17 which introduces, into the flash circuit by way of the setting of the wiper arm 19, the specific value factor corresponding to the flash source. As shown in both FIGS. 2 and 3, the distance setting control 16 is provided with a setting scale 16a which acts in conjunction with a fixed mark 20a arranged, for example, on the front plate 20 of the camera shutter. The setting control 17, which may be connected to an exposure time setting control 22 at different relative positions by means of a releasable coupling handle 21, includes an index scale 17a which is set with respect to a mark 22a provided on the exposure time setting control 22 to set into the camera the particular index value or guide number value.

The expression "flash index" generally refers to the guide number at a specific film sensitivity. For the embodiment of the invention presently being described, the index corresponding to the guide number at 18°. Thus, the index represents a single invariable value for the intensity of the flash source. Instead of the index, a scale of flash bulb types may be provided which contains, for example, the reference values PF1, PF5, XM1, XM5, etc. However, because flash bulbs of differing intensities are sold commercially under the same tradenames, it is not expedient to use such a scale. If only for this reason, it is preferable to use the index scale. If flash exposures are to be taken by using a flash source, either flash bulb or electronic flash, which has, for example, a guide number "20" for a film sensitivity of 18°, the index setting control 17 is set at the value "20." The intensity of the flash source used is, thus, set into the camera. Consequently, the index or guide number need only be changed if the photographer uses a flash source which is different from the flash source for which the camera has been set.

FIG. 2 also shows that exposure time setting control 22 carries, in addition to the usual exposure time scale 22b, a film sensitivity scale 22c. The exposure time is set by moving the exposure time scale 22b until the desired value is positioned opposite a fixed mark 23a. FIG. 3 shows that the fixed mark 23a is mounted on the camera tube 23. The film sensitivity is set by a setting control 24 which is provided with a fixed mark 24a and which is non-rotatably connected to the exposure time setting control 22 at different relative positions by means of a releasable coupling handle 25. The setting control 24 includes a toothed portion 24b which is operatively connected by way of a gear drive indicated in the drawing simply by pinions 26 and 27 and a dot-dash line, to a toothed segment 1a of a member which may, in turn, be fixed to the base frame 1b of the measuring mechanism 1. The basic position of the base frame 1b is dependent upon the values of the specific light factors, such as exposure time and film sensitivity, which are set into the camera. This is the case for most cameras with fully automatic or semi-automatic diaphragm settings for in such cameras, a diaphragm aperture corresponding to the prevailing light conditions which is also dependent upon the presetting of exposure time and film sensitivity can be brought about only when these factors have been set into the measuring mechanism 1.

The rotating coil of the measuring mechanism 1 carries an indicator 1c which moves along a scale 28 containing the diaphragm values. At the end of the scale 28 and beyond the extreme values "2.8" and "22" are warning fields 29 and 30, respectively, which indicate, as soon as the indicator 1c enters the particular field, that because of the prevailing light conditions useful photographs will not be developed because of over exposure or under exposure. The arrangement of the diaphragm scale 28, the two warning fields 29 and 30 and the measuring mechanism 1 is such that the measured result is visible in a window of the housing or reflected into the view finder by means of prisms. A calibration mark 31 is provided to permit checking the voltage conditions in the respective circuits in which a measuring mechanism 1 is included.

The arrangement of the individual setting controls in FIG. 3 coincides substantially with the arrangement shown in FIG. 2. The slight difference between the arrangements in FIGS. 2 and 3 is that in FIG. 3, the setting control 24 which serves to set the film sensitivity is arranged between the flash index setting control 17 and the exposure time setting control 22. Elements in FIG. 3 corresponding to elements in FIG. 2 have been given the same reference numerals. In addition to the elements described in connection with FIG. 2, FIG. 3 also shows another setting control 32 provided for the manual setting of the diaphragm. Setting control 32 includes, in addition to a diaphragm setting scale 32a marked "MANUAL," two setting positions identified by a flash symbol and by a sun symbol. These setting positions, jointly associated with the word "AUTO," are designed to set or switch the camera from one automatic range to the other. In particular, these setting positions correspond to automatic daylight exposure setting and automatic flash exposure setting.

The camera illustrated in FIG. 3 is set for automatic flash exposures since the "AUTO" setting mark showing the flash symbol is positioned opposite the fixed mark 23a. In order to facilitate the manipulation of the setting member 32, fingerpieces 33 are provided which are arranged opposite each other and are firmly affixed to the circumference of the setting control 32. Although not shown in the drawing, there is associated with the setting control 32 conventional means, for example, in the form of a control cam and transmission members cooperating with the control cam, for effecting the required control over the diaphragm when the "MANUAL" setting range is selected. In addition, an operative connection exists between the setting control 32 and the double-pole switch 4, 5 since the switch is actuated in response to the setting control 32 being switched from the automatic daylight setting range to the automatic flash setting range and vice versa.

The gear connection effected by means of pinions 26 and 27 between the measuring mechanism 1 and the setting control 24 exists both during automatic daylight settings and automatic flash settings. Even when flash exposures are taken, the measuring mechanism 1 is rotated upon a change in position of the two setting controls 22 and 24 to the same extent as when daylight exposures are taken. The result is that the position of the base frame 1b of the measuring mechanism 1 is changed both when the exposure time and when the film sensitivity are set. A change in the exposure time for flash exposures does not change the density or blackening of the negative unless there is appreciable daylight brightness, but because it must be possible to select shorter exposure times than $\frac{1}{30}$ second for flash exposures, the invention provides that the setting of the potentiometer 9 associated with the exposure time setting control 22 compensate electrically for the rotation of the measuring mechanism caused by a change in position of the exposure time setting control. This means that a change in position of the indicator 1c with respect to the fixed diaphragm scale 28 resulting from rotation of the measuring mechanism 1 is compensated for, or cancelled, electrically by means of a change in the voltage in the circuit of the measuring mechanism 1 brought about by means of the setting of the potentiometer 9 in response to the setting movement of the exposure time setting control 22. The voltage applied to the measuring mechanism 1 prior to a change in the position of the exposure time setting control 22 is thereby either increased or decreased in proportion to the setting movement of the setting control 22 or to the rotary movement of the measuring mechanism. However, the compensation for the rotation of the measuring mechanism 1 applies only to positional changes of the exposure time setting control 22, while the rotation of the measuring mechanism caused by a change in the film sensitivity changes the position of the indicator 1c and thereby remains operative, in the final analysis, for the automatic diaphragm setting. The potentiometer 9, designed for taking into consideration the intensity of the flash source, is settable with respect to the index scale 17a which indicates the intensity of the flash source in values applicable to a specific film sensitivity. Instead of using a single resistor or potentiometer which both takes into consideration the intensity of the flash source and compensates for unavoidable changes in the basic position of the measuring mechanism 1 during the setting of the exposure time, it is possible to use two resistors electrically connected to effect both results.

As already indicated above, the flash index setting control 17 is releasably coupled to the exposure time setting control 22. Moreover, the flash index scale 17a and the setting mark 22a acting in conjunction with the scale 17a are arranged directly on the two setting controls 17 and 22. If the position of the flash index setting control 17 or the exposure time setting control 22 is changed, the wiper arm 19 moves accordingly thereby altering the resistance division of the potentiometer 9. In another arrangement, the potentiometer 9 may be connected to the flash index setting control 17 and is settable independently of the exposure time setting control 22 in which case a positional change of the setting control 17 would bring about a positional change in the wiper arm 19 of the potentiometer 9. For such an arrangement, the fixed mounting of the potentiometer 9 would be dispensed with. In addition, the flash index setting control 17 would be set opposite a fixed index scale, while the exposure time setting control 22 would be connected to the wiper arm 19 of the potentiometer 9.

Figure 4:
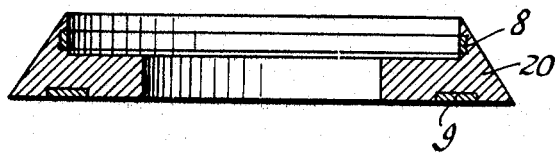
FIG. 4 shows a cross-section view taken through the front plate of the intra-lens shutter illustrated in FIG. 3.

With respect to the specific configuration of the arrangement of the two potentiometers 8 and 9, potentiometer 8 may, for example, be strip-shaped and inserted, as shown in FIG. 4, into a cylindrical recess serving to receive the lens assembly and arranged within the front plate 20 of the intra-lens shutter. The potentiometer 9 may be annular and arranged on the plane surface of the front plate 20 which faces the setting controls 17 and 22. Due to the limitations in space, in intra-lens shutters, it is advisable to form the potentiometers 8 and 9 as carbon layer potentiometers.

Figure 5:
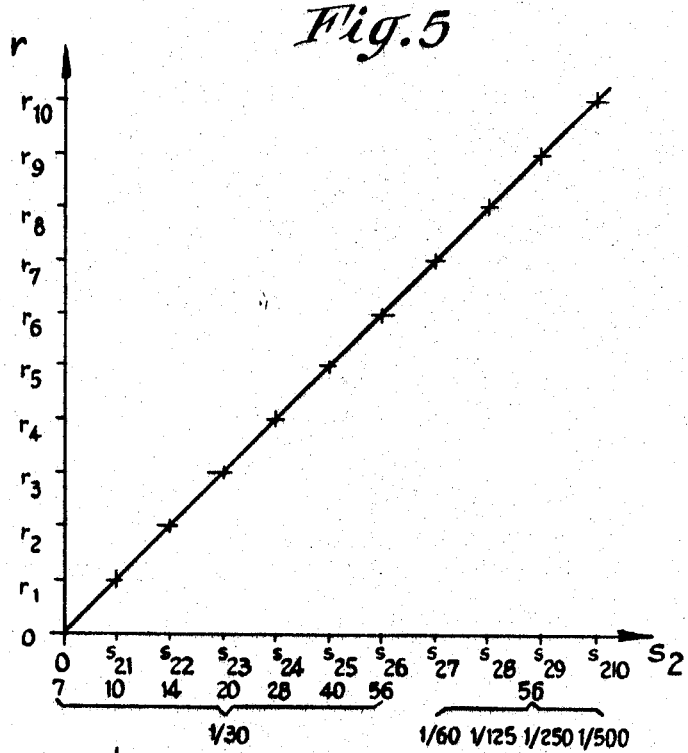
FIG. 5 shows the characteristic curve of the potentiometer associated with the exposure time setting control, by way of an r-s plot.

FIG. 5 illustrates, by way of an $r$-$s$ plot, the linear characteristic curve of the potentiometer 9. Commencing at the origin of the coordinate system, the distances which may be covered by the sliding contact 19, $s_{21}$ to $s_{29}$ and $s_{210}$, are plotted on the abscissa while the corresponding resistance values $r_1$ to $r_{10}$ corresponding to the point of contact are plotted on the ordinate axis. As is also apparent from the diagram in FIG. 5, the index values "7" to "56" may be associated at a constant exposure time of $\frac{1}{30}$ second, with the distances of $s_{21}$ to $s_{26}$. Variations of the exposure time from $\frac{1}{60}$ to $\frac{1}{500}$ second at an index value of "56" may also be provided. The exposure times of $\frac{1}{60}$ to $\frac{1}{500}$ second are associated with distances $s_{27}$ to $s_{29}$ and $s_{210}$ as well as with respective resistance values $r_7$ to $r_{10}$. As to the 0-point located between the two potentiometers 8 and 9 in FIG. 1, the potentiometer 9 is designed to have such a characteristic that the resistance values $r_1$ to $r_{10}$ change in direct proportion to the increase in the distance from the 0-point.

Figure 6:
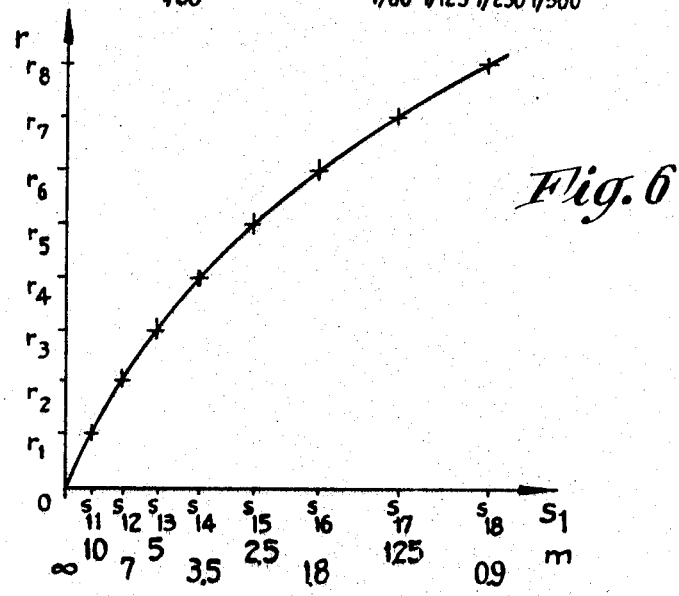
FIG. 6 shows the curve of the potentiometer cooperating with the distance setting control, also by way of an r-s plot.

Because it is well known that the distance setting control 16 has a progressive setting characteristic, the potentiometer 8 associated with setting control 16 is designed to have a non-linear, hyperbolic characteristic curve. In the $r$-$s$ plot illustrated in FIG. 6, the distances $s_{11}$ to $s_{18}$ are plotted on the abscissa while the associated resistances $r_1$ to $r_8$ are plotted on the ordinate axis. The potentiometer 8 is so constructed as to have a characteristic that, in relation to the 0-point of FIG. 1 or the associated setting value "∞" of the distance setting scale 16, for a continuous displacement of the wiper arm 18 in the direction of $s_{18}$, the respective resistance value $r$, changes progressively in accordance with the characteristic curve shown in FIG. 6. A change in the tapping point on the potentiometer brought about as the wiper arm 18 is moved along the resistance of the potentiometer, results in a corresponding voltage being applied to the measuring mechanism 1.

Figure 7:
FIG. 7 is a table of voltage value supplied to the measuring mechanism both for automatic daylight exposures and automatic flash exposures.

FIG. 7 is a table which shows, by way of a particular example, the correlation of voltage values applied to the measuring mechanism 1 for different settings in both the automatic daylight range and the automatic flash range. The lowest voltage value which is indicated by the measuring mechanism 1 is designated by $U_0$. This may be termed the initial sensitivity. It is further apparent from the table, that this is the lowest indicating value of the indicator 1c and corresponds to a diaphragm aperture of "2.8." The voltage value $U_v$ changes continuously. It increases as the measuring mechanism 1 moves toward the extreme position in the direction of the maximum indicating value corresponding to a diaphragm aperture of "22."

Figure 8:
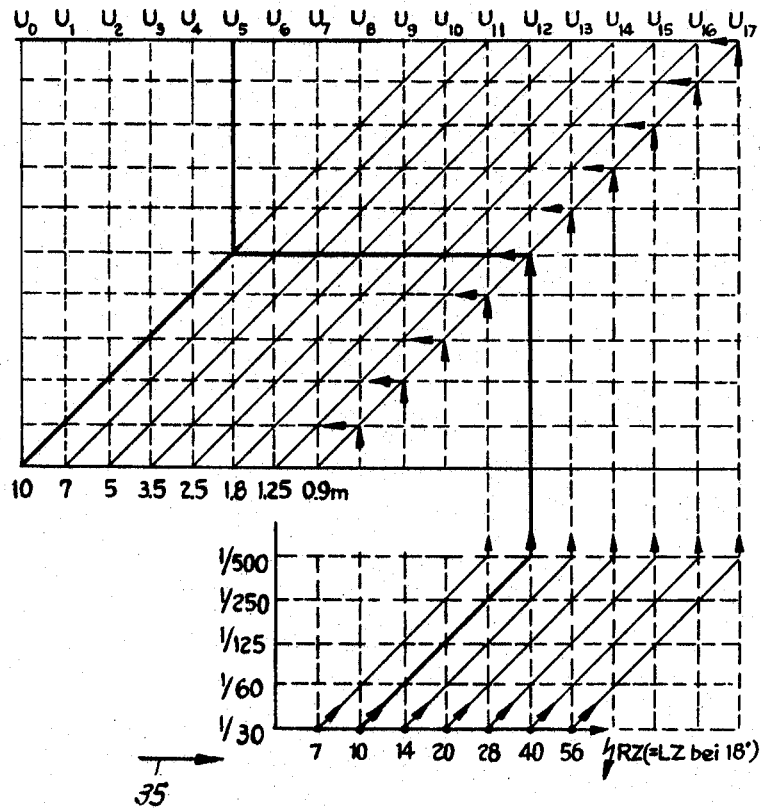
FIG. 8 is a nomogram which shows the relationship between the respective voltage supplied to the measuring mechanism, the flash index, the preselected exposure time, and the distance setting.

FIG. 8 shows a nomogram which supplements the table of FIG. 7. The nomogram illustrates, in a general manner, the relationship between the voltage U applied to the measuring mechanism 1, the flash index, the preselected exposure time, and the associated distance. As indicated by the horizontal arrow 35 pointing at the index values, the nomogram starts at the index.

In order to determine what voltage U corresponds to a specific flash index, to a specific exposure time, and to a specific distance, the following procedure may be followed:

(a) Starting from the particular flash index or guide number, one proceeds along the associated 45° line to the corresponding parallel line of the exposure time in question;

(b) Then, one proceeds vertically upward to the heavy solid 45° line associated with the value 0.9 m.;

(c) Then, one proceeds on a parallel line to the 45° line associated with the corresponding distance;

(d) From this point, one follows the vertically ascending line and finally arrives at the voltage value U.

This procedure is also to be followed when ascertaining the voltage value of other combinations. There is one exception, however, for those combinations which include a distance setting of 0.9 m. If this is the distance value in question, one proceeds from the point determined by step (b) above and moves immediately upward to the U-scale, from which the desired voltage value may be read.

As a specific example, consider the combination of values consisting of the index or guide number 10, the exposure time $\frac{1}{500}$ second, and the distance value 10 m. Proceeding from the index or guide number 10, the 45° line is followed to the point of interception with the horizontal line associated with an exposure time of $\frac{1}{500}$ second. The vertical line ascending from the point of intersection is followed until it intersects the slightly heavier solid 45° line associated with a value 0.9 m. The horizontal line is followed to the left until the 45° line associated with a distance of 10 m. is reached. It is now necessary to move upward on the vertical line starting from the point of intersection until finally arriving at $U_5$. The desired voltage value is thus $U_5$. For the sake of clarity the above described procedure leading to the voltage value $U_5$ is indicated by a heavy solid line in FIG. 8.

The manipulation of the camera for both automatic daylight settings and flash settings will both be explained briefly below:

Automatic daylight setting

In order to effect exposures with an automatic, light responsive diaphragm setting in the daylight range of operation, the setting control 32 of the camera shutter is moved to the "AUTO" setting position identified by the sun symbol after a specific exposure time has been preset. When this "AUTO" position is set, the double-pole switch 4, 5 is in such a position that the switch blades are in contact with the terminals identified by the sun symbol. The measuring mechanism 1 is now supplied with a current having a magnitude dependent upon the prevailing light conditions which causes a specific deflection of the indicator 1c of the measuring mechanism 1. This deflection in conjunction with a conventional sensing device, controls the setting of the diaphragm in accordance with the prevailing light conditions.

Automatic flash setting

In order to effect flash exposures, the setting member 32 of the camera shutter is moved to the "AUTO" setting position identified by the flash symbol. When this position is set, the blades of the double-pole switch 4, 5 make contact with the switch terminals identified by the flash symbol. Prior to effecting the exposure, the exposure time setting control is set at a specific exposure time. For flash bulb exposure, the time to be selected is $\frac{1}{30}$ second while any other short exposure time, for example, $\frac{1}{500}$ second, can be set for electronic flash exposures. When the exposure time is set, the measuring mechanism 1 is rotated correspondingly. Absent the compensating effect of the potentiometer 9, a change in the exposure time by a specific exposure time step would result in the indicator 1c indicating a value differing by one diaphragm step from previously set value. For example, if the exposure time were changed from $\frac{1}{125}$ second to $\frac{1}{250}$ second and if the indicator had previously been positioned opposite a diaphragm value of "16," the indicator 1c would now point to a diaphragm value of "11." The resulting exposure, would therefore, be overexposed by one diaphragm step. In order to avoid this, that is, in order to compensate for the rotation of the measuring mechanism 1 caused by the positional change of the exposure time setting control 22 and the resulting change in the indication of the indicator of the measuring mechanism, the tapping point on the potentiometer 9 changes by way of the coupling handle 25 and the wiper arm 19 connected to the index setting control 17. As already stated above, a change in the exposure time from $1/125$ second to $1/250$ second causes an increase in the voltage picked off so that the indication of the measuring mechanism at $1/125$ second is maintained when the exposure time is changed to $1/250$ second.

A voltage of specific magnitude, dependent upon the position of the wiper arm 19, as well as the position of the wiper arm 18, is applied to the measuring mechanism 1 which results in a corresponding deflection of the indicator 1c. The position of the indicator 1c is sensed in the same manner as in the automatic daylight setting operation so that the diaphragm aperture, according to the diaphragm value indicated, is set automatically upon the actuation of the camera release member.

*Manual setting*

In order to manually set the diaphragm, the setting control 32 is moved in such a manner that the desired diaphragm value of the diaphragm scale 32a is positioned opposite the fixed mark 23a. After the exposure time and distance have been set, the intra-lens shutter of the camera may be released in the usual manner.

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A photographic camera comprising: a focus control, an automatic diaphragm settable for daylight and flash exposures, said diaphragm being settable in response to the position of a measuring mechanism indicator of an electric exposure meter, wherein during daylight exposures, exposure time and film sensitivity are considered by a change in the position of said measuring mechanism; two settable resistor means for setting the current through said measuring mechanism for flash exposures, the first of the said resistor means being settable according to the intensity of the flash source and the second of said resistor means being settable according to the setting of said focus control, said camera having for flash exposures gear connection means between said measuring mechanism and setting members for exposure time and film sensitivity wherein said measuring mechanism is movable simultaneously during the setting process of said two setting members to the same extent as during taking of daylight exposures, said first settable resistor means being operatively connected to said setting member for exposure time whereby a change of the basic position of said measuring mechanism effected by the setting motion of the said member for exposure time is electrically compensated and wherein changes in the basic position of the measuring mechanism brought about by setting motion of the setting member for film sensitivity remain operative, said first settable resistor means serving at the same time for taking into consideration the intensity of the flash source and which can be set with respect to a scale indicating the intensity of the flash source for values for a specific film sensitivity.

2. The photographic camera of claim 1 wherein said first resistor means electrically compensating the setting motion of said exposure time setting member and designed to take into consideration the intensity of the flash source comprises a single resistor.

3. The photographic camera of claim 1 comprising, in addition, a coupling handle whereby said flash index setting member can be coupled in different relative positions with said exposure time setting member.

4. The photographic camera of claim 1 wherein said pair of resistor means are two potentiometers and are both fixedly arranged on the front plate of the intra-lens shutter.

5. The photographic camera of claim 4 wherein said potentiometers are in the form of carbon layer potentiometers.

References Cited

UNITED STATES PATENTS 3,072,028  1/1963  Lange _____ 95—10
3,283,681  11/1966  Singer et al. _____ 95—10

NORTON ANSHER, *Primary Examiner.*

J. F. PETERS, *Assistant Examiner.*